June 26, 1934.          J. CRAIG          1,963,956

BALL TRANSFER

Filed March 20, 1931

INVENTOR
JAMES CRAIG
BY
ATTORNEYS

Patented June 26, 1934

1,963,956

UNITED STATES PATENT OFFICE 1,963,956

BALL TRANSFER

James Craig, Butler, Pa., assignor to Mathews Conveyer Company, Ellwood City, Pa., a corporation of Pennsylvania Application March 20, 1931, Serial No. 524,117

11 Claims. (Cl. 193—41)

This invention relates to new and useful improvements in anti-friction ball transfers, generally, and an object of the invention is to provide such a device having means for preventing the anti-friction elements or ball bearings thereof from bunching together when the ball transfer is being operated, as when a load passes thereover.

A further object of the invention is to provide an anti-friction ball transfer provided with means for preventing dust and foreign matter from entering the ball race thereof.

A further object is to provide a ball transfer comprising a support provided with a cup-shaped ball race having a plurality of anti-friction elements therein, upon which a relatively large steel ball is rotatably supported, and a retaining member being mounted upon said support and having an inwardly projecting annular flange, the edge of which terminates in close proximity to the periphery of the large ball, and an outer enclosing cap fitting over said retaining member and having an aperture in its upper portion through which a portion of the large ball projects, the edge of said aperture having a knife edge engaging the periphery of the ball whereby said cap is floatingly supported upon said ball, and whereby foreign matter cannot be carried downwardly into the ball race by the periphery of the large ball when the latter is rotated.

Features of the invention reside in the general construction of the support in which the cup-shaped ball race is formed; in the provision of the retaining member having a cylindrical portion fitting over said support and secured thereto by a suitable resilient locking member, said retaining member having an inwardly projecting annular flange, the edge of which terminates adjacent to the periphery of the large ball, whereby the gap between the periphery of the ball and the ball race is substantially closed; in the provision of the outer enclosing cap and the means whereby said cap is floatingly supported upon the large ball; and, in the general construction of the ball transfer as a whole.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 1:
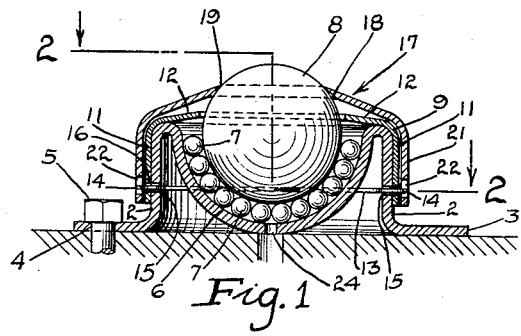
Figure 1 shows a cross-sectional view of my improved ball transfer taken on the line 1—1 of Figure 2.

The novel ball transfer featured in this invention comprises a support 2 shown provided with an outwardly projecting annular flange 3 having apertures 4 therein whereby the transfer may be secured in position by suitable bolts 5, as indicated. The support 2 is shown made from sheet metal and has an upright cylindrical portion wherein is disposed a concaved or cup-shaped ball race 6, adapted to contain a plurality of anti-friction elements or ball bearings 7, as best shown in Figure 1. A relatively large ball 8, preferably of steel, is rotatably supported upon the ball bearings 7, as will readily be understood by reference to Figure 1.

A retaining member 9 is provided for keeping the ball bearings 7 in the ball race 6. This retaining member is shown provided with a cylindrical portion 11 adapted to be fitted over the correspondingly shaped upright portion of the support 2, whereby it is retained in axial alinement with the axis of the ball race 6. The retaining member 9 is provided at its upper portion with an inwardly projecting annular flange 12, the edge of which terminates in close proximity to the periphery of the ball 8, whereby the gap provided between the periphery of the ball 8 and the surface of the ball race 6 is substantially closed at the upper portion of the ball race. The flange 12 of the retaining member 9 is shaped so that the inner portion thereof adjacent to the ball 8 is disposed at a relatively higher elevation than the outer portion thereof, for the purpose of enlarging the space directly therebeneath. The ball race 6 is also so shaped that the space between the surface thereof and the periphery of the ball 8 directly beneath the annular flange 12 of the retaining member, is slightly larger than the diameter of the ball bearings 7, whereby the ball bearings may readily roll around in said race way and fill in the vacant space resulting from rotation of the large ball 8. By thus shaping the ball race 6 and the flange 12 of the retaining member 9, the ball bearings 7 may freely roll around within the ball race, when the ball 8 is rotated.

Figures 2, 3:
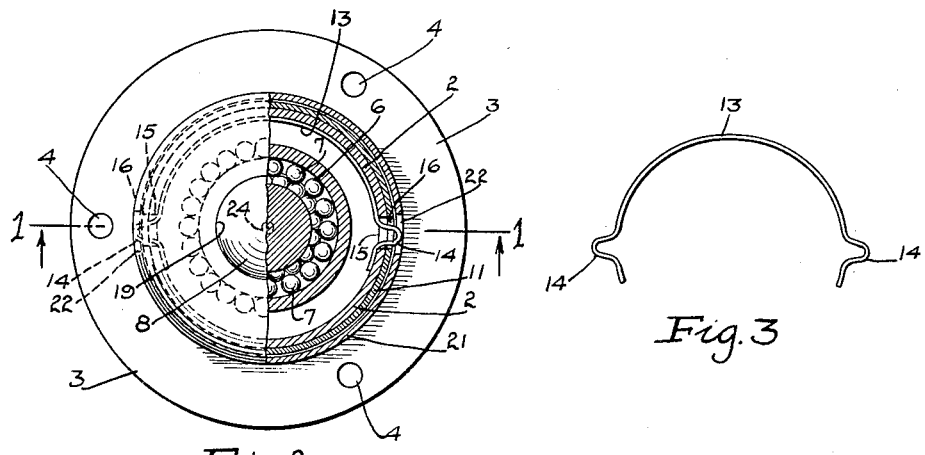
Figure 2 is a sectional plan view on the line 2—2 of Figure 1.
Figure 3 is a view showing the resilient lock spring removed from the device.

The retaining member 9 is shown detachably secured to the support 2 by means of a lock spring 13 preferably shaped as shown in Figure 3 and having oppositely projecting portions 14 fitting in apertures 15 provided in the wall of the support 2, and correspondingly shaped apertures 16 provided in the depending cylindrical portion 11 of the retaining member 9. The lock spring 13 secures the retaining member 9 to the support 2 and prevents it from relatively rotating thereon. In some instances it may be deemed desirable to secure the retaining member 9 to the support 2 by a press fit.

Means are provided for preventing dust and foreign matter from entering the ball race, and consists of an outer enclosing cap 17, the upper wall or flanged portion which is upwardly and inwardly directed is provided with an enlarged aperture 18, through which a portion of the ball 8 projects as best shown in Figure 1. The edge of the aperture 18 is formed with a knife edge 19 which directly engages the periphery of the ball 8, whereby the joint between the periphery of the ball and the cap 17 is substantially sealed against dust and other foreign particles which may adhere to the exposed portion of the periphery of the ball 8 when the ball transfer is in use.

The cap 17 has a depending cylindrical portion 21 loosely fitting over the correspondingly shaped portion of the retaining member 9, and is provided adjacent to its lower edge with suitable apertures 22 adapted to receive the projections 14 provided on the lock ring 13, as clearly shown in Figures 1 and 2. The apertures 22 of the cap 17 are relatively large so as to permit relative movement of the cap with respect to the retaining member 9 and support 2 when the ball transfer is operated, and whereby the cap is floatingly supported upon the ball 8. By thus constructing the cap 17, dust and foreign particles cannot enter the ball race 6, as will readily be understood by reference to Figure 1.

Figure 4:
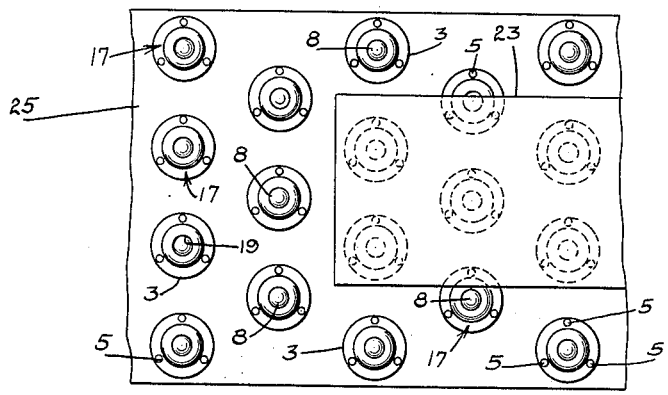
Figure 4 is a plan view showing an application of the ball transfer.

The ball transfer may be used as shown in Figure 4, wherein it will be noted that a plurality of transfers are secured to a suitable support 25 such, for example, as a table or a floor, and are spaced in relatively close relation so that articles or boxes such as indicated by the numeral 23 may be conveyed over the ball transfers, as will be readily understood by reference to Figure 4. By thus arranging the ball transfers upon a table or floor, articles having flat bottoms, or which are flat in nature, may be conveyed or transported over the table or floor and in any desired direction, because of the fact that the balls 8 are mounted for universal movement. Articles may also be delivered onto the ball top table from any direction and discharged therefrom at any desired angle.

The novel ball transfer herein disclosed has been found particularly useful in such places as foundries, where the air is usually laden with dust as are also the articles to be conveyed, which dust constantly tends to work into the ball race 6 of the transfer. A suitable aperture 24 is provided in the bottom of the ball race 6, through which any foreign matter which may accidentally find its way into the ball race may be expelled. Should any foreign matter thus get into the ball race 6, it will be expelled from the ball race through the aperture 24 by the actions of the ball bearings 7 during operation of the transfer, it being understood that as the ball 8 is rotated in different directions, the ball bearings 7 will gradually work any such foreign matter into the bottom of the ball race 6, from whence it will be precipitated through the aperture 24.

I claim as my invention:

1. A ball transfer comprising a cup-shaped ball race having anti-friction elements therein, a relatively larger ball rotatably supported on said elements, means for retaining the elements in said race, an enclosing cap fitting over said ball race and said retaining member and having an aperture therein through which a portion of the large ball projects, and means by which said enclosing cap is floatingly supported.

2. A ball transfer comprising a cup-shaped ball race having anti-friction elements therein, a relatively larger ball rotatably supported on said elements, and an enclosing cap fitting over said ball race and having an aperture therein through which a portion of the large ball projects, said cap being supported upon the periphery of said ball.

3. A ball transfer comprising a cup-shaped ball race having anti-friction elements therein, a relatively larger ball rotatably supported on said elements, a member surrounding said ball race and adapted to retain the elements therein, and a flanged enclosing cap fitting over said ball race and said retaining member, said cap having an aperture therein defined by a knife edge adapted to engage the periphery of said ball.

4. A ball transfer comprising a support provided with a cup-shaped ball race having a plurality of ball bearings therein, a relatively larger ball supported upon said ball bearings, a retaining member having a cylindrical portion fitting over a portion of said support whereby said retaining member is axially alined with said ball race, and an outer enclosing cap having an aperture therein through which a portion of the ball projects, said aperture being relatively smaller than the diameter of said ball, whereby the cap is floatingly supported upon the ball.

5. A ball transfer comprising a support provided with a cup-shaped ball race having a plurality of anti-friction elements therein, a relatively larger ball supported on said elements, means for retaining said elements in the ball race when the transfer is operated, and means supported upon the periphery of the ball adapted to prevent foreign matter from entering said ball race and contacting with the anti-friction elements therein.

6. A ball transfer comprising a support having an upright cylindrical portion provided with a cup-shaped ball race having a plurality of ball bearings therein, a relatively larger ball supported upon said ball bearings, a retaining member having a cylindrical portion fitting over the cylindrical portion of said support whereby said retaining member is axially alined with said ball race, an outer enclosing cap having an aperture therein through which a portion of the ball projects, said aperture being relatively smaller than the diameter of said ball whereby the cap is floatingly supported upon the ball, and a resilient locking element having portions projecting through alined apertures in the walls of said support, retaining member, and cap whereby said parts are retained in operative positions.

7. A ball transfer comprising a cup-shaped ball race having a plurality of ball bearings therein, a relatively larger ball supported upon said ball bearings, and a member floatingly supported upon 8. A ball transfer comprising a body portion having a concaved ball race therein, a plurality of ball bearings in said race, a relatively larger ball rotatably supported upon said ball bearings, a ball retaining member fitting over said body portion and having an aperture therein through which the larger ball projects, a dust cap loosely fitting over said retaining member, and a member supported on said body portion and having means for loosely engaging said cap to prevent the latter from accidentally becoming separated from said body portion.

9. A ball transfer comprising a body portion having a concaved ball race therein, a plurality of anti-friction elements in said ball race, a spherical member rotatably supported upon said elements, a retaining member for said elements fitting over said body portion and having an aperture therein for receiving said spherical member, a cap fitting over said retaining member and having an upwardly and inwardly directed portion intermediate the line of contact with said retainer and said spherical member, said upwardly and inwardly directed portion being spaced from said retainer, and means for holding said body portion, retaining member and cap in assembled relation.

10. A ball transfer comprising a body portion formed from a blank of sheet metal having its central portion depressed to provide a semispherical, concaved ball race, and having its outer marginal edge portions bent downwardly to provide a cylindrical wall, a plurality of anti-friction elements in said ball race, a spherical member rotatably supported upon said elements, a retaining member for said elements fitting over the cylindrical wall of said body portion and having an aperture therein for receiving said spherical member, a cap fitting over said retaining member and having its upper wall disposed over said retaining member and spaced therefrom adjacent to said spherical member, and means for holding said body portion, retaining member and cap in assembled relation.

11. A ball transfer comprising a body portion formed from a blank of sheet metal having its central portion depressed to provide a semispherical, concaved ball race, and having its outer marginal edge portions bent downwardly to provide a cylindrical wall terminating at its bottom in an outwardly turned flange whereby the said body portion may be secured to a suitable support, a plurality of anti-friction elements in said ball race, a spherical member rotatably supported upon said elements, a retaining member for said elements fitting over the cylindrical wall of said body portion and having an aperture for receiving said spherical member, and a cap fitting over said retaining member and having an aperture in its upper wall through which a portion of said spherical element projects, and means for holding said body portion, retaining member and cap in assembled relation.

JAMES CRAIG.